May 20, 1969 T. TEMPLE 3,445,675

PULSE GENERATING SYSTEMS

Filed Dec. 31, 1962 Sheet 1 of 4

INVENTOR
TREVOR TEMPLE

BY Herbert W. Arnold

ATTORNEY

INVENTOR
TREVOR TEMPLE
BY Herbert W. Arnold
ATTORNEY

INVENTOR
TREVOR TEMPLE
BY Herbert W. Arnold
ATTORNEY

INVENTOR
TREVOR TEMPLE

BY Herbert W. Arnold
ATTORNEY

United States Patent Office 3,445,675
Patented May 20, 1969

3,445,675
PULSE GENERATING SYSTEMS
Trevor Temple, Kingston, N.H., assignor to Raytheon Company, Lexington, Mass., a corporation of Delaware
Filed Dec. 31, 1962, Ser. No. 248,777
Int. Cl. H03k *3/64;* H04m *19/00*
U.S. Cl. 307—88 16 Claims The present invention relates to pulse generating systems and, more particularly, to a pulse generating system which combines the operational characteristics of magnetic and controlled electrical discharge devices for the generation of pulses.

Figure 1:
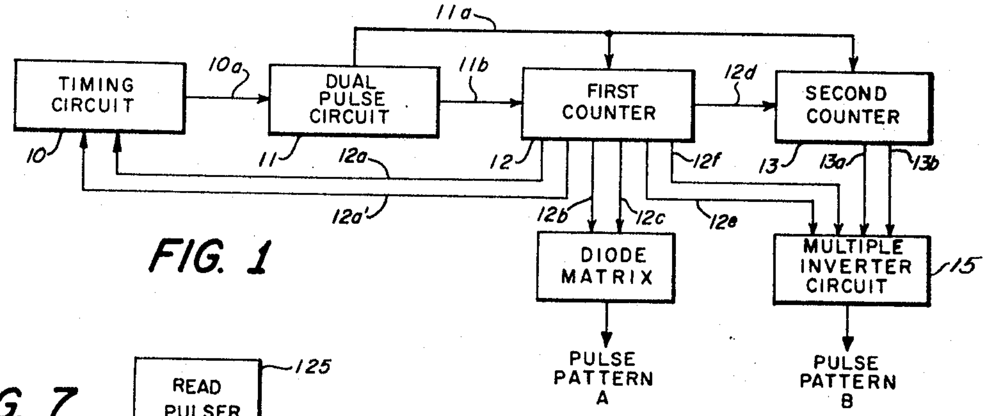

One of the problems incident to the design of high power pulse generating systems is the requirement for a reliable device which will simultaneously provide output pulses over extended periods of time at relatively high power levels. In the past, it has been proposed that for telephone signal interrupter applications, such as busy signals and bell ringing, where relatively high power pulses are required, that a motor driven, cam operated, rotary contact system be utilized to produce relatively high power pulses. It has been found that the use of such an electromechanical system introduces problems of reliability due to the carbonizing of the rotary contact over extended periods of time. This is particularly true when such devices are utilized in a humid salt-like atmosphere, such as for shipboard telephone interrupters and pulse programmers. It has been additionally proposed that high power transistors be utilized to produce a reliable high powered telephone signal interrupter pulse generating system. However, up to the present time, there have been inherent reliability problems whenever these high powered transistors were used, which necessitated frequent maintenance of such systems. Additionally, there has been a requirement for a reliable pulse generator to be used for machine programming and other areas requiring finite timing in conjunction with substantial power levels. For example, magnetic core logical circuits generally do not provide timed output pulses at relatively high output levels and, therefore, require the use of extensive amplifying devices.

It is accordingly an object of this invention to provide a new and improved relatively high powered reliable pulse generating system which utilizes the properties of magnetic core and controlled electrical discharge devices, such as controlled rectifiers and the like.

In accordance with the invention, an embodiment of a system for accomplishing the aforementioned pulse generating technique comprises a timing circuit for providing timing signals for and a dual pulse controlled rectifier circuit for providing two pulse driving signals in response to the timing signals from the timing circuit. The system includes a first counter circuit comprising, in combination, magnetic core and controlled rectifier devices for producing both a relatively high power output signal pattern and a plurality of drive pulses when energized by driving signals from the dual pulse circuit. In addition, the system includes, a second counter having a plurality of magnetic-controlled rectifier elements for producing a plurality of drive signals when actuated by driving signals from the first counter and timing signals from the timing circuit. Furthermore, the system comprises a multiple inverter having a pair of magnetic core-controlled rectifier elements to produce a second relatively high power output signal pattern when actuated by driving signals from both the first and second counters.

For better understanding of the present invention, together with other further objectives thereof, reference is had to the following description taken in connection with the accompanying drawings and its scope will be pointed out in the appended claims.

Figure 7:
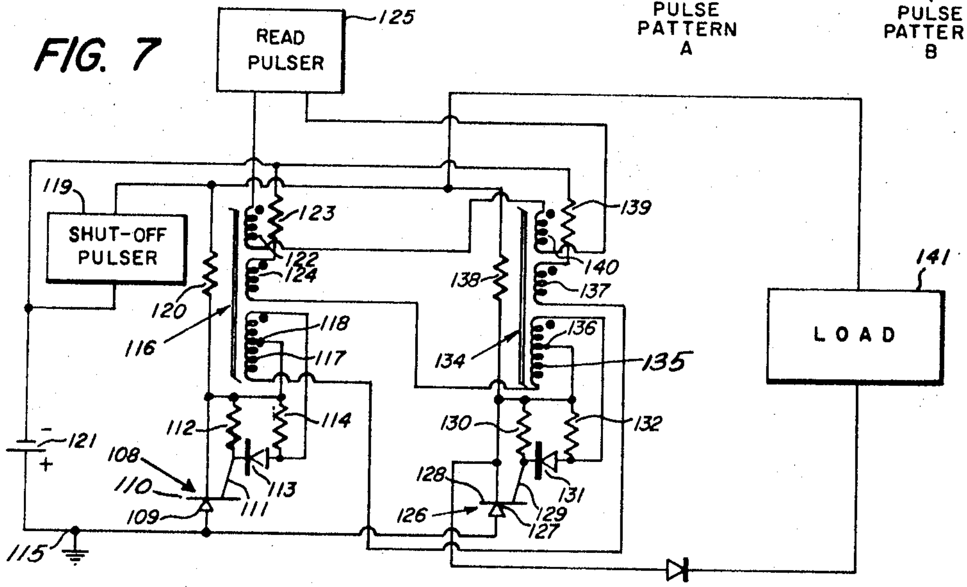
Figure 8:
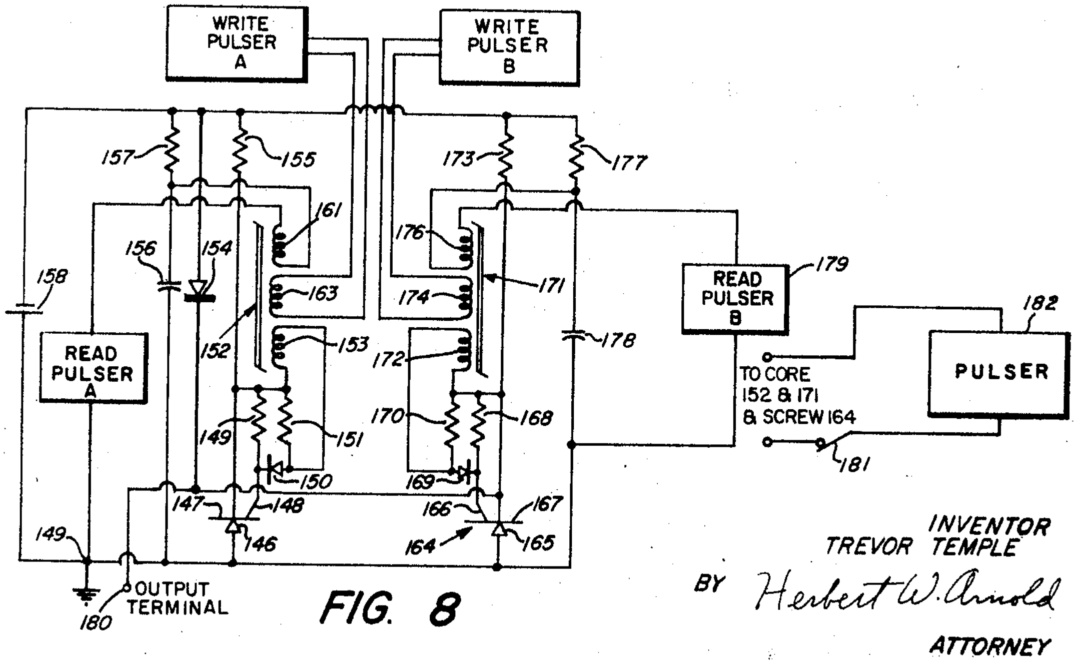
Figures 2, 3, 4, 5, 6:
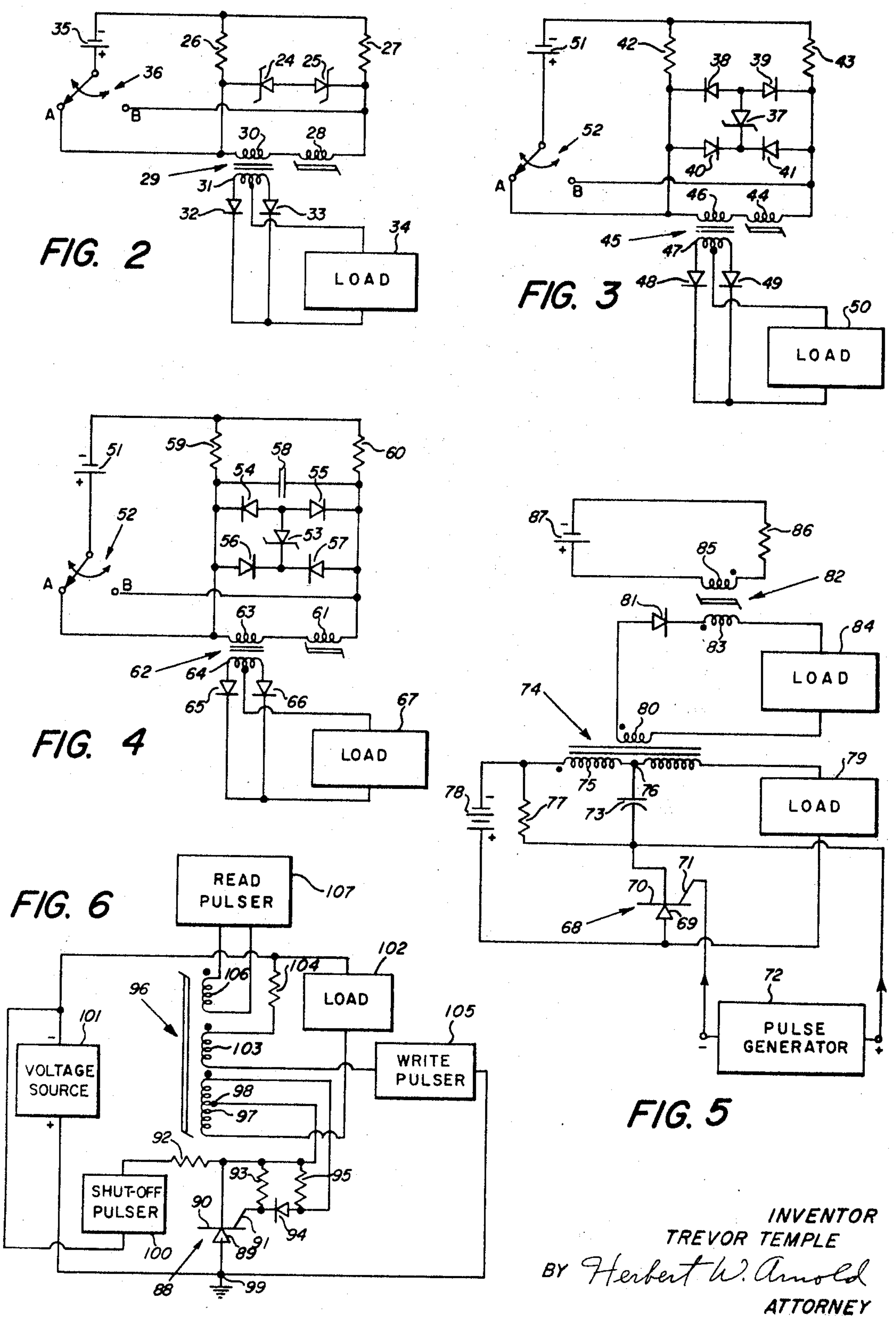

Other objects will become apparent from the following description taken in connection with the accompanying drawings, wherein:

FIG. 1 is a block diagram of the general arrangement of a solid state controlled rectifier pulse generating system, including a timing circuit, a dual pulse circuit, first and second counters, a diode matrix and a multiple inverter circuit; and FIG. 2 is a schematic diagram of a timing circuit, including a power source, a plurality of Zener diodes, a magnetic core and a rectifier circuit for producing output timing pulses; and FIG. 3 illustrates a schematic diagram of another embodiment of a timing circuit, including the power source, a Zener diode in combination with a plurality of diodes, magnetic core and a rectifier circuit for producing output timing pulses; and FIG. 4 illustrates the general arrangement of an additional embodiment of a timing circuit, including a power source, a Zener diode, a plurality of diodes, a magnetic core, a capacitor and a rectifier circuit for producing output timing pulses; and FIG. 5 is a schematic diagram of a dual pulse circuit, including an output power pulse source, a silicon controlled rectifier, a plurality of D.C. power sources, a transformer, a magnetic core and a capacitor, which shows a novel technique for producing a dual purpose output pulse; and FIG. 6 is a schematic diagram of a single silicon controlled rectifier active element of the counters in combination with a magnetic core device; and FIG. 7 illustrates a schematic diagram of a counter circuit, including a power source, a plurality of silicon controlled rectifiers, a plurality of magnetic core devices and a plurality of pulse sources, which shows the novel combination of controlled rectifiers and magnetic core logic; and FIG. 8 illustrates the general arrangement of a multiple purpose inverter circuit, including a power source, a pluraility of pulse sources, a plurality of controlled rectifier devices and a plurality of magnetic core devices, which shows a novel technique for producing output pulses; and FIGS. *9a* and *9b* are a schematic diagram of the general arrangement of a controlled rectifier pulse generating system in circuit form, including a timing circuit, a dual pulse circuit, first and second counters, a diode matrix and a multiple inverter circuit, which shows a circuit diagram of an embodiment of the invention.

Referring to FIG. 1, there is shown an embodiment of a pulse generating system of the invention, which for simplicity is shown in a block diagram, each of said blocks being subsequently described in connection with FIGS. *9a* and *9b*. In particular, timing circuit 10 comprises a timing base of the pulse generating system. An embodiment of timing circuit 10 is shown in detailed form in FIG. *9a* and utilizes magnetic core devices for controlling the time cycle of the timing circuit. In FIG. 1, timing circuit 10 is connected to dual pulse circuit 11. An embodiment of dual pulse circuit 11 is shown in FIG. *9a* in which a combination of magnetic core and controlled rectifier devices produce a plurality of actuating pulses. A first counter 12 comprises a plurality of solid state controlled rectifier active elements in combination with magnetic core elements connected to the dual pulse circuit 11 and to the timing circuit 10, an embodiment of the first counter being subsequently shown in FIG. *9a*. A second counter 13 comprises a second plurality of solid state controlled rectifier active elements in combination with magnetic core elements connected to the dual pulse circuit 11 and to the first counter 12, an embodiment of the second counter being subsequently shown in FIG. *9b* which is an extension of the circuit shown in FIG. *9a*. A diode matrix 14, well-known in the computer art, is connected to the first counter 12. A multiple inverter circuit 15 is connected to the first counter 12 and the second counter 13. An embodiment of said multiple inverter circuit 15 is subsequently shown in FIG. *9b* which shows, in combination, a plurality of controlled rectifier magnetic core elements for providing a pattern of high powered pulses. In the complete pulse generating system circuit diagram subsequently shown in FIGS. *9a* and *9b*, each of the above components are shown interconnected so as to function as the system block diagram of FIG. 1.

Considering now the operation of the controlled rectifier pulse generating system of FIG. 1 for producing an output pulse pattern A and an output pulse pattern B and referring simultaneously to FIG. 1 and FIGS. *9a* and *9b* for the purpose of clarity, and assuming that controlled rectifier 245 of first counter 12 is initially conducting, the timing circuit 10 provides a timed pulse over line 10*a* which energizes the dual pulse circuit 11. This pulse causes a controlled rectifier 212, of dual pulse circuit 11, to conduct so that a first pulse is transmitted by way of line 11*a* to the first counter 12 and the second counter 13, and a delayed second pulse to be transmitted by way of line 11*b* to the first counter 12. The arrival of the first pulse at counter 12 and counter 13 causes the conducting active element 245 of counter 12 to cease conducting and does not, at present, affect the non-conducting active controlled rectifier elements of counter 13. The arrival of the delayed second pulse at the counter 12 causes controlled rectifier active element 265 to conduct and simultaneously to generate a relatively high pulse at the cathode 267 of element 265. The initiation of conduction of counter 12 active element 265 is sensed and fed back over line 12*a* to the timing circuit 10 to re-initiate the timing cycle which, in turn, once again, cuts off any of the conducting active elements of the first counter and subsequently generates an output pulse by turning on the next active element such as active element 280 of counter 12 of FIG. *9a*. A diode matrix 14 senses the conduction of the active elements such as controlled rectifiers 245, 265, 280 and 294 of the first counter by way of lines 12*b* and 12*c* and then combines these outputs into a pulse pattern A output. The timing cycle is repeated until, after a period of time, first counter 12 will have counted up to the maximum number of individual magnetic core controlled rectifier elements with the first counter, which as shown in FIG. *9a* to be a total of 4. At this time, the first counter recycles itself and simultaneously transmits a pulse by way of line 12*d* to counter 13. This pulse over line 12*d* turns on a controlled rectifier 316. This turning on of controlled rectifier 316 then initiates an output pulse over line 13*a* for transmission to inverter circuit 15. Additionally, counter 12 provides a fourth output pulse over line 12*e*, which in combination with the output pulse over line 13*a* causes the multiple inverter circuit 15 to initiate a pulse pattern B by turning on controlled certifier 369. This cycle is repeated until the next time the first counter in combination with the second counter transfers a second pair of pulses from controlled rectifier elements over lines 12*f* and 13*b* to cause inverter circuit 15 to cease providing pulse pattern B by turning off controlled rectifier 370. It is to be noted that variations in the pulse pattern A emanating from the diode matrix 14 can be varied by either altering the internal connections of the diode matrix or connecting different controlled rectifiers of the first counter to the diode matrix. Additionally, it is possible to program variations in pulse pattern B by having multiple inverter circuit 15 put out a pulse pattern by sensing different counting controlled rectifier elements of the first and second counters. A detailed description of FIGS. *9a* and *9b* is subsequently given.

Now referring particularly to FIG. 2, there is shown an embodiment of a timing circuit for generating a series of timed actuation pulses which are suitable for use as system block diagram 10 of FIG. 1. The timing circuit of FIG. 2 comprises a pair of Zener diodes 24 and 25 connected, in series, for providing a reference voltage approximately equal to the reverse breakdown voltage of the Zener diodes, a pair of resistors 26 and 27 connected in parallel across the series Zener diodes combination, a square hysteresis loop magnetic core 28 and a transformer 29 having a primary winding 30 connected in series across the Zener diode pair, a secondary winding 31 having a pair of diodes 32 and 33 at opposite ends, and a load 34 may be the dual pulse circuit 11 of FIG. 1, connected across the center tap of transformer secondary winding 31 and the common connection between diodes 32 and 33. There is also shown a source of B+ 35 and a switch 36 for alternately connecting the source of B+ 35 to opposite sides of the Zener diode combination 24 and 25 to re-initiate the timing cycle.

Considering now the operation of the timing circuit and referring to FIG. 2, assuming that the core 28 is initially saturated in one direction by an external source and switch 36 is moved to the A position so as to apply B+ to the junction of resistor 26, primary winding 30 and Zener diode 24 and across the combination of Zener diodes 24 and 25. The Zener diodes 24 and 25 hold the voltage across the transformer 29, primary winding 30 and the core 28 at a constant voltage determined by the drop across Zener diodes 24 and 25. During this time, the core 28, which is saturated in one direction, starts to saturate in the opposite direction due to the position of the switch 36 in the A position. After a period of time, the core of magnetic core 28 saturates and its impedance drops to the resistance of its coil. This instantaneous impedance drop results in a surge of current through the primary winding 30 of transformer 29 which, in turn, energizes transformer secondary winding 31 to cause a pulse to be applied through the diodes and the center tap winding of transformer secondary 31 to load 34. The cycle is then repeated by switching switch 36 into position B to, once again, initiate a pulse through the rectifier comprising the secondary winding 31 of transformer 29, and diodes 22 and 23 connected across load 34.

Referring particularly to FIG. 3, there is shown another embodiment of a timing circuit which is suitable for use as system block diagram timing circuit 10 of FIG. 1 comprising a Zener diode 37 for providing a voltage reference, a first pair of rectifying diodes 38 and 39 connected in series, a second pair of rectifying diodes 40 and 41 connected in series, the mid-point between diodes 38 and 39 having one end of Zener diode 37 connected thereto and the intersection of diodes 40 and 41 having the other end of Zener diode 37 connected thereto. A pair of resistors 42 and 43 connected to the common junction of diodes 38 and 40, respectively, a magnetic core 44 connected in series with the primary winding 46 of transformer 45 connected across the junction points of resistor 43, respectively. A secondary winding 47 of transformer 45 having a pair of diodes 48 and 49 connected at opposite ends and a load 50, which could be the dual pulse circuit 11 of FIGS. 1 and *9a*, connected across the center tap of transformer secondary winding 47. There is also shown a source B+ 51 and a switch 52 for alternately connecting the source of B+ 51 to opposite sides of the series connection of transformer 45, primary winding 46 and magnetic core 44 to re-initiate the timing cycle.

Considering now the operation of the timing circuit and referring to FIG. 3 and assuming that the core 44 is initially saturated in one direction by an external source, switch 52 is closed in the A position so as to apply B+ to the junction of resistor 42, diodes 38 and 40 and transformer 45, primary winding 46. The Zener diode 37 in combination with diodes 38, 39, 40 and 41 holds the voltage across the transformer primary winding 46 and the magnetic core 44 at a constant voltage determined by the drop across the Zener diode and the diode combination. During this time, the core 44, which is saturated in one direction, starts to saturate in the opposite direction due to the position of switch 52 in the A position. After a period of time, the core of magnetic core 44 saturates and its impedance drops to the resistance of its coil. This instantaneous impedance drop results in a surge of current through transformer primary 46 which, in turn, energizes transformer secondary winding 47 to cause a pulse to be applied through the diodes and the center tap of transformer secondary 47 to load 50.

Referring particularly to FIG. 4, there is shown an additional embodiment of a timing circuit which is suitable for use in the system block diagram timing circuit 10 of FIG. 1, comprsing a Zener diode 53 for providing a voltage reference, a first pair of rectifying diodes 54 and 55 connected in series and a second pair of rectifying diodes 56 and 57 connected in series, the mid-point between diodes 54 and 55 having one end of Zener diode 53 connected thereto and the intersection of diodes 56 and 57 having the other end of Zener diode 53 connected thereto. A capacitor 58 is connected to the juncture of diodes 54 and 56 and the juncture of diodes 55 and 57. A resistor 59 is connected to one end of capacitor 58 and a resistor 60 is connected to the opposite end of capacitor 58, resistors 59 and 60 being connected to a common point. A magnetic core 61 connected in series with the primary winding 63 of transformer 62 connected across the junction of resistor 59, capacitor 58, diode 54 and diode 56 and the junction tap of diodes 55 and 57, resistor 60 and capacitor 58, respectively. A secondary winding 64 of transformer 62 having a pair of diodes 65 and 66 connected at opposite ends and a load 67, which may be the dual pulse circuit 11 of FIGS. 1 and *9a,* connected across the center tap of transformer secondary winding 64. This circuit produces two output pulses for each timing pulse applied thereto from the timing circuit of FIG. 4. There is also shown a source of B+ 51 and a switch 52, as shown and numbered in FIG. 3, for alternately connecting source of B+ to opposite sides of the series connection of primary winding 63 and magnetic core 61 to re-initiate the timing cycle.

Considering now the operation of the timing circuit and referring to FIG. 4 and assuming that the core 61 is initially saturated in one direction by an external source, switch 52 is placed in the A position so as to apply B+ to the junction of resistor 59, diodes 54 and 56, capacitor 58 and transformer primary winding 63. The Zener diode 53 in combination with diodes 54, 55, 56 and 57 holds the voltage across the transformer primary winding 62 and the magnetic core 61 at a constant voltage determined by the drop across the Zener diode and the diode combination. During this time, the capacitor 58 charges up the voltage across the Zener diode combination. Additionally, core 61, which is saturated in one direction, starts to saturate in the opposite direction due to the position of switch 52 in the A position. After a period of time, the core of magnetic core 61 saturates and its impedance drops to the resistance of its coil. This instantaneous impedance drop results in a surge of current through transformer primary winding 46 which is reinforced by the discharge of capacitor 58 through this low impedance path. This surge of current through transformer primary winding 46, in turn, energizes transformer secondary winding 64 to cause a relatively high amplitude sharp pulse to be applied through the diodes 65 and 66 and the center tap of transformer secondary winding 64 to the load 67. The cycle is then repeated by switching switch 52 to position B to, once again, initiate a pulse through the rectifier comprising the secondary 64 and diodes 65 and 66 connected across load 67.

Additionally, the capacitor 58, as shown and described in relation to FIG. 4, could be incorporated in the embodiment of FIG. 2 across the series combination of Zener diodes 24 and 25 in order to reinforce the surge of current through the coil of magnetic core 28 and primary winding 30 of FIG. 2.

Referring particularly to FIG. 5, there is shown a dual pulse circuit for producing a pair of actuating pulses in response to a single input pulse and which is suitable for use as system block diagram dual pulse circuit 11 of FIG. 1. This pulse circuit comprises a controlled rectifier 68 which could be of the silicon type, having an anode 69, a cathode 70, and a control element or gate 71. A pulse generator 72 is connected between the gate 71 and the cathode 70, the pulse generator could be the timing circuits of FIGS. 2, 3, and 4, respectively. There is also shown a charging capacitor 73 connected to the cathode 70 and the pulse circuit 72. Additionally, there is shown a transformer reactor 74 having a primary winding 75 and having a tap point 76 on primary winding 75 wherein the other end of capacitor 73 is connected. Additionally, there is shown a shunt resistor 77 connected between one end of the primary winding 75 and the junction of cathode 70, pulse generator 72, and capacitor 73. There is also shown a voltage source 78 connected at one end to the junction of resistor 77 and primary winding 75 and at the other end to the anode 69 of the silicon controlled rectifier 68. A load 79 is connected to the other end of the primary winding 75 and to the junction anode 69 and the voltage source 78. The load 79, for example, could comprise the active elements; namely, the silicon controlled rectifiers 245, 265, 280, 294, 316, 337, and 351 of counters 12 and 13 of FIGS. 1 and *9a.* Additionally, there is shown a secondary winding 80 of reactor 74 having a diode 81 connected to the other end. The load 84 could be the magnetic core elements 253, 274, 288 and 302 of counter 12 of FIGS. 1 and *9a.* There is also shown a square hysteresis loop magnetic core 82 having a winding 83 connected between the diode 81 and the load 84. Additionally, there is shown another winding 85 of magnetic core 82 having a resistor 86 connected at one end and a source of voltage 87 connected at the other end, the resistor 86 being connected at its opposite end to the opposite end of the voltage source 87.

Considering now the operation of the dual pulse circuit and referring to FIG. 5 and assuming that silicon controlled rectifier 68 is initially non-conductive, a pulse generator 72 is forwarded between gate 71 and cathode 70 in order to turn on silicon controlled rectifier 68. This turning on of silicon controlled rectifier 68 charges capacitor 73 through one-half of the primary 75 of the reactor 74. The capacitor charging current by transformer action brings the load 79, connected to the opposite end of primary winding 75, to a positive potential and thus is capable of providing a first output pulse which may be used, for example, to shut off any of the active elements of the counters of FIGS. 1 and *9a,* respectively. As capacitor charging current continues to flow, the voltage across the capacitor continues to use more negative than the supply voltage due to resonant charging produced by the series L.C. current of capacitor 73 and primary winding 75. Resonant charging is defined as where a capacitor is charged from a voltage source through a series reactor. When the voltage across the capacitor reaches the supply voltage, current is still flowing in the series circuit. The stored energy in the reactor maintains this flow of current at a reducing rate till the stored energy in the reactor is transferred to the capacitor raising its voltage above the supply voltage. As the capacitor charging current drops to zero and tends to reverse, the controlled rectifier 68 is turned off and the capacitor 73 slowly discharges through the shunt resistor 77. During this resonant charging of the capacitor 73, the voltage across inductor 74 reverses its polarity and produces a second pulse in the secondary winding 80 which is applied to load 84 through diode 81 and magnetic core delay unit winding 83. The magnetic core delay unit is used to steepen the leading of this second output pulse applied to the load 84. This second output pulse could be utilized to provide the second pulse described as actuating counter 12 of FIG. 1. The voltage source 87 through the winding 85 on magnetic core 82 provides a reverse saturation for core 82 so as to allow another of the pulses to load 84 to occur the next time the cycle is repeated by the next pulse from pulse generator 72.

Referring particularly to FIG. 6, there is shown a single controlled rectifier active element 88 which could be of the silicon type, in combination with a square hysteresis loop magnetic core device 96 which could be utilized as the individual counter elements of counters 12 and 13 of FIG. 1. There is shown a controlled rectifier 88, which could be of the silicon type, having an anode 89, cathode 90 and a control element or gate 91. Anode 89 being connected to a ground point 99. A resistor 92 is connected to the cathode 90 and a resistor 93 is connected between the gate 91 and the junction of resistor 92 and cathode 90. A diode 94 is connected to the junction of resistor 93 and gate 91 and a resistor 95 is connected at the opposite end of diode 94 and the junction of resistors 92 and 93. There is also shown a magnetic core 96 having a winding 97 and a tap 98, being connected at the tap 98 to the junction of resistors 92, 93 and 95 and at one end of winding 97 to the junction of diode 94 and resistor 95. The winding 97 could be two separate windings which are joined at a common point, such as tap 98 as shown in FIG. 6. There is also shown a shut off pulser 100 for providing an actuating pulse which is connected on one side to the junction of resistors 92, 93 and 95 and tap 98 of winding 97. A shut off pulse could be provided by one of the output pulses provided by the circuit of FIG. 5, such as, for example, the output pulse produced across load 79. There is also shown a source of voltage 101 connected at one side to ground point 99 and at the other side to shut off pulser 100, a second winding 103 on core 96 having a resistor 104 is connected at one end and a write pulser 105 which provides a source of actuating pulses for core 76 is connected to the opposite end of winding 103, the opposite end of the write pulser 105 being connected to the ground point 99 and the opposite end of resistor 104 being connected to the other side of voltage source 101. There is also shown a load 102 which is connected to the other side of winding 97 and to the junction of voltage source 101 and resistor 104. Additionally, there is shown an additional winding 106 of core 96 having a read pulser 107 connected at opposite ends. The read pulser 107 produces a source of read pulses for actuating core 96.

Considering now the operation of the circuit shown in FIG. 6 and assuming initially that controlled rectifier 88 is nonconducting and that core 96 is saturated in a zero condition which represents one degree of saturation, the saturating of core 96 in the zero condition is accomplished by the initial connection of an external source to one of the windings, such as winding 106, on magnetic core 96 so as to insure that core 96 is saturated in the zero condition while at the same time disconnecting the connections from core 96 to controlled rectifier 88. A read pulse is supplied to the core 96 through winding 106 from read pulser 107 which reverse saturates the core 96 to the one condition. This read pulse, through core action, simultaneously provides a pulse from winding 97 which fires controlled rectifier 88 which, in turn, transmits a signal pulse to the load 102. A write pulse from write pulser 105 is then transmitted, through winding 103, to saturate the core 96, once again, in the zero condition. A shut off pulse is then forwarded from the shut off pulser 100 to cathode 90 to shut off the controlled rectifier 88 to allow the cycle to be repeated. The sequence of operation of the read, write and shut off pulses could be controlled either manually or by the operation of an external timing oscillator, coupled to shut off pulser 100, write pulser 105 and read pulser 107. The diode 94 and resistors 93 and 95 could be eliminated if better components, such as controlled rectifiers and magnetic cores are available in the future. They are shown in the diagram of FIG. 6 in order to attenuate the unwanted outputs from the magnetic core due to deviations from a substantially perfect square loop characteristic, so as to prevent the turning on of the controlled rectifier by these unwanted outputs.

Referring particularly to FIG. 7, there is shown two counter circuits including a pair of controlled rectifiers 108 and 126, which could be of the silicon type, in combination with a pair of magnetic core devices which could be utilized as counters 12 and 13 of FIG. 1. There is shown a controlled rectifier 108 having an anode 109, cathode 110, and a control element or gate 111. Anode 109 is connected to a ground point 115 and a resistor 112 is connected between the cathode 110 and the gate 111. A diode 113 is connected at one end to the junction of resistor 112 and gate 111 and at the other end is connected to a resistor 114, the resistor 114 being connected at its other end to the junction of the resistor 112 and the cathode 110. There is also shown a square hysteresis loop magnetic core 116 having a winding 117 and a tap 118, the tap 118 being connected to the junction of resistors 112 and 114 and the cathode 110 and one end of the winding 117 being connected to the junction of the resistor 114 and diode 113. The winding 117 could be two separate windings coupled at a common point such as tap 118 of FIG. 7. There is shown a shut off pulser 119 which provides a source of pulses to cut off controlled rectifiers 108 and 126 and which is connected on one side to the junction of resistors 112 and 114, center tap 118 and cathode 112 through a load resistor 120. There is also shown a source of voltage 121 connected at one side to ground point 115 and at the other side to pulser 119. A feed forward winding 122 on core 116 is connected through a resistor 123 to the other side of voltage source 121. Additionally, there is an input winding 124 on core 116 being connected to a read pulser 125 which provides read pulses to actuate the core.

There is additionally shown a second controlled rectifier 126, which could be of the silicon type, having an anode 127, cathode 128 and gate 129. The anode 127 being connected to the ground point 115, the cathode 128 and the gate 129 being connected across resistor 130. A diode 131 being connected to the junction of resistor 130 and gate 129 and a resistor 132 being connected to the other end of the diode 131 and the junction of resistor 130 and cathode 128. There is also shown a second magnetic core 134 having a winding 135 which has a tap 136, the tap 136 being connected to the junction of resistors 130 and 132 and the cathode 128. One end of the winding 135 being connected to the junction of diode 131 and resistor 132. The other end of the winding 135 being connected back to the other end of the winding 122 of core 116. There is also shown a feed forward winding 137 on core 134, one end being connected to the other end of winding 117 on core 116 and the other end being connected through a resistor 139 to the junction of the voltage source 121 and the resistor 123. Additionally, there is shown a load resistor 138 being connected at one end to the junction of resistors 130 and 132, the cathode 128 and the tap 136 and at the other end being connected to the junction of shut off pulser 119 and the resistor 120. Furthermore, there is shown an input winding 140 on core 134, one end of the winding 140 being connected to the other end of winding 124 on core 116 and the other end of winding 140 being connected to the read pulser 125. There is also shown a load 141 being connected at one end through an isolating diode 142 to cathode 128 of controlled rectifier 126 and at its other end to the junction of resistors 120 and 138.

Assuming initially that the controlled rectifier 108 is on or conducting, core 116 is saturated in a clear condition which will be represented by a one state, controlled rectifier 126 is non-conducting and core 134 is in a reset condition which is represented by a zero state. The initial condition of the cores 116 and 134 is achieved by saturation of core 116 to the clear condition and of core 134 to the reset condition by initially connecting an external source to any one of the windings 117, 124 and 122 on cores 116 and 134, respectively, while simultaneously disconnecting all other windings from cores 116 and 134, respectively. Additionally, controlled rectifier 108 is initially placed in the "on" position by a pulse applied from an external source being applied to the gate 111 of controlled rectifier 108 while simultaneously disconnecting the winding 118 from the controlled rectifier 108.

The operation of the circuit of FIG. 7 will now be described. A pulse from shut off pulser 119 is transmitted to cathode 110 which turns off conducting silicon controlled rectifier 108. A read pulse from the read pulser 125 is then transmitted through windings 124 and 140 of cores 116 and 134, respectively. This read pulse causes the core 134 to saturate in the one state. It is to be noted that it is not necessary that the read pulse be large enough to completely saturate core 134 to the one state. The circuit would still be operable inasmuch as core 134 would be switched to the one state by a signal passing through the lower portion of winding 135 after controlled rectifier 126 is turned on. The saturation of core 134 to the one state causes a pulse to be applied through the upper portion of winding 135 to turn on controlled rectifier 126. The turning on of controlled rectifier 126 produces a pulse signal output through the lower portion of winding 135 which insures that core 134 is completely saturated in that one state, and simultaneously provides this signal to core 116 through winding 122 to reset core 116 in the reset condition or zero state. This procedure is continued by subsequent shut off and read pulses circulating through the circuit, to provide continuous operation of the counter. An output signal is provided to load 141 by tapping off and sensing the "on" condition of controlled rectifier 126 through diode 142.

Referring particularly to FIG. 8, there is shown a multiple inverter circuit or a flip-flop, including a plurality of controlled rectifiers, which could be the silicon type, in combination with a plurality of magnetic core devices which can be utilized as the basic multiple inverter circuit of FIG. 1. There is shown a controlled rectifier 145 having an anode 146, cathode 147 and a control element or gate 148. Connected between the gate 148 and the cathode 147 is a resistor 149, connected to the junction of resistor 149 and gate 148 is a diode 150, and connected to the other side of diode 150 is a resistor 151 which is connected to the junction of cathode 147 and resistor 149. There is shown a square hysteresis loop magnetic core 152 having an output winding 153 which is connected at one end to the junction of diode 150 and the resistor 151 and at the other end to the junction of resistors 149 and 151 and cathode 147. There is additionally a diode 154 connected to the junction of cathode 147, resistors 149 and 151 and one end of winding 153 and a load resistor 155 which is connected to the junctions of resistors 149 and 151, cathode 147, diode 154 and one end of winding 153. The anode 146 is connected to the ground point 149, a capacitor 156 is connected at one end to the ground point 149 and at the other end to a resistor 157, the resistor 157 is connected to the junction of diode 154 and resistor 155. There is also shown a voltage source 158 which is connected at one end to the ground point 149 and at the other end to the junctions of resistors 157 and 155 and diode 154. Additionally, a read pulser A159 is connected at one side to the ground point 149 and to an input winding 161 on core 152 to the junction point of resistor 157 and capacitor 156. Furthermore, a write pulser A162 is connected at opposite ends of input winding 163 on magnetic core 152 and a coupling capacitor 160 is connected at one end to the junction point of cathode 147, diode 154, resistors 149, 151 and 155 and winding 153. There is shown a controlled rectifier 164 having an anode 165, a cathode 166 and a control element or gate 167. Connected between the cathode 166 and the gate 167 is resistor 168. Connected at the junction of resistor 168 and gate 167 is diode 169; connected to the opposite end of the diode 169 is a resistor 170, the other end of resistor 170 being connected to the junction of cathode 166 and resistor 168 and the junction of the cathode 166, and the resistors 168 and 170 being connected to the other side of the capacitor 160. Additionally, there is shown a square hysteresis loop magnetic core 171 having an output winding 172 connected at one end to the junction of resistors 170 and 168, cathode 166 and capacitor 160 and at the other end to the junction of diode 169 and resistor 170. A write pulser B175 is connected to an input winding 174 on magnetic core 171 and a load resistor 173 is connected between the junction point of the cathode 166, the capacitor 160, the resistors 170 and 168 and one end of the winding 172 and at the resistor's other end to the junctions of resistors 155 and 157, diode 154 and voltage source 158. A read pulser B179 is connected at one end to the ground point 149 and at the other end through an input winding 176 on magnetic core 171 through a resistor 177 to the junction point of resistors 155, 157 and 173, diode 154 and voltage source 158. A capacitor 178 is connected at the junction of resistor 177 and one end of winding 176 and at its other end to the ground point 149. There is also shown the output terminal 180, whereby the pulse wave form from the multiple inverter circuit may be tapped which is connected at the junction points of cathode 147, capacitor 160, diode 154, one end of winding 153 and resistors 149 and 151. Additionally, there is shown a switch 181 and a pulser 182 which are connected to one of the core windings, such as windings 163 and 174 on each of the cores 152 and 171, and to the gate 167 of controlled rectifier 164. Pulser 182 provides a pulse to initially set the cores 152 and 171 and turn on controlled rectifier 164. The read pulser A159 and the write pulser A162 could be replaced, respectively, by output lines 12*e* and 13*a* of counters 12 and 13 of FIG. 1. The read pulser B179 and the write pulser B175 could also be replaced, respectively, by output lines 12*f* and 13*b* of counters 12 and 13 of FIG. 1.

Considering now the operation of the circuit shown in FIG. 8 and assuming initially that cores 152 and 171 are set in the zero state and controlled rectifier 164 is turned on or conducting by external switch 181 in combination with a pulser 182 which is initially connected sequentially to one of the core windings, such as windings 163 and 174, on the cores 157 and 171, and to the gate of 167 of controlled rectifier 164. The write pulser A 162 transmits a pulse through the winding 163 which resets the core 152 to the one state. Subsequently, read pulser A159 transmits a pulse through winding 161 which simultaneously sets the core 152 to the zero state. This setting of core 152 to the zero state produces a pulse at winding 153 which turns on controlled rectifier 148. The turning on of controlled rectifier 148 turns off controlled rectifier 164 by a pulse coupled through capacitor 160 to the cathode 166 of controlled rectifier 164, and simultaneously provides an output signal pattern at output terminal 180. This output pattern could be similar to that shown as pulse pattern B which is shown in FIG. 1. At a later time, write pulser B175 transmits a pulse through winding 174 of core 171 to place the core 171 in the reset one state. Thereafter, read pulser B179 transmits a pulse through winding 176 of core 171 to return core 171 to the zero set state. This returning of core 171 to the zero state turns on controlled rectifier 164. The turning on of controlled rectifier 164 produces an output pulse which cuts off controlled rectifier 145 by a pulse coupled through capacitor 160 to cathode 147. The cessation of conduction of controlled rectifier 145 causes the pulse pattern, which was being provided at output terminal 180, to be turned off. The cycle can then be repeated, once again, by a pulse from write pulser A162 reinitiating the timing pulse cycle.

Referring particularly to FIGS. *9a* and *9b* there is shown an arrangement of a pulse generating system as shown in FIG. 1 including a timing generator 10, a dual pulse circuit 11, a first counter 12, a second counter 13, a diode matrix 14 and a multiple inverter circuit 15. There is shown a voltage source 200 connected at one end to a ground point 201 and the other end through switch 202 to a resistor 203. There is shown a reed switch 204 having a coil 204*a* with an external push button contact 205 connected thereto at one end and being connected to ground point 201 at its other end. A resistor 206 is connected to one end of element 205, a capacitor 207 is connected to the junction of element 205 and resistor 206. There is shown a magnetic core 208 having an input winding 209 with a tap 210. Said winding 209 is connected at one end to the other end of capacitor 207 and at its other end to the other end of resistor 206. There is shown the active element 211 of reed switch 204 which is connected at one end to tap 210 and at its other end to ground point 201. There is shown a controlled rectifier 212, which could be of the silicon type, having an anode 213, a cathode 214 and a control element or gate 215. The anode 213 is connected to the ground point 201. The gate 215 is connected through a diode 216 to an output winding 217 on magnetic core 208, said winding 217 being connected at its other end to cathode 214. There is also shown a capacitor 218 connected at one end to a ground point 201 and at its other end to the junction of capacitor 207, resistor 206 and switch element 205. A resistor 219 is connected between cathode 214 and gate 215. A pair of rectifying diodes 220 and 221 are both connected to the junction of resistor 219, gate 215 and diode 216, and at their other ends to a secondary winding 222 on transformer 223, transformer secondary winding 222 having a tap 224, said tap 224 being connected to the junction of resistor 219, cathode 214 and winding 217. Additionally, there is an isolating diode 225 connected at one end to resistor 203 and at its other end to the junction of capacitor 218, capacitor 207, resistor 206 and element 205. There is also shown a shunt resistor 226 being connected at one end to the junction of diode 225, capacitor 218, capacitor 207, resistor 206 and element 205 and at its other end to the junction of tap 224, resistor 219, cathode 214 and winding 217. There is also shown a shut off reactor 227 having a primary winding 228 connected at one end to the junction of diode 225, resistor 226, capacitor 218, capacitor 207, resistor 206 and element 205, and having a tap 229 connected through a charging capacitor 230 to the junction of cathode 214, resistor 219, tap 224, winding 217 and resistor 226. There is shown a pair of load resistors 231 and 232 connected at one end respectively to the other end of winding 228, a pair of rectifying diodes 233 and 234 connected in series across the other ends of resistors 231 and 232, a second pair of rectifying diodes 235 and 236 also connected across the other ends of resistors 231 and 232 and a Zener diode 237 connected between the junctions or diodes 233 and 234 and 235 and 236, respectively. A charging capacitor 238 is connected across the other ends of resistors 231 and 232 and a primary winding 239 of transformer 223 is connected in series with a winding 241 which is on a magnetic core 240 and connected across the end of resistors 231 and 232. There is shown a resistor 242 connected at one end to the junction of resistor 226 and diode 225 and its other end through a reset winding 243 of core 244 to ground point 201. There is additionally a controlled rectifier 245, which could be of the silicon type, having an anode 246, a cathode 247 and a control element or gate 248. Anode 246 being connected to the ground point 201, cathode 247 being connected through a load resistor 249 to the junctions of resistors 231 and 232 and the other end of winding 228. A resistor 250 is connected across the cathode 247 and gate 248; a diode 251 is connected across to the junction of resistor 250 and gate 248 and an additional resistor 252 is connected across the diode 251 and the junction of resistor 250, resistor 249 and cathode 247. Additionally, a core 253 having a winding 254 wth a tap 255, said tap 255 being connected to the junctions of resistors 252 and 249 and one end of winding 254 being connected to the junction of diode 251 and resistor 252. Also shown is a feed forward winding 256 on core 253 having one end connected through a resistor 257 to the junctions of resistors 242 and 226, diode 225 and the other end of winding 228. This junction will henceforth be designated as point 258. There is shown a secondary winding 259 on reactor 227 having connected thereto the active elements 260 of a read switch 261 and its other end through a diode 262 to a delay winding 263 on core 244. There is also shown an input winding 264 on core 253 being connected at one end to the other end of winding 263. A second controlled rectifier 265 having an anode 266, a cathode 267 and a control element or gate 268 is shown. A load resistor 269 is connected to the cathode 267 and at its other end to the junction points of resistors 249, 232, and 231 and reactor 227, which henceforth will be designated as junction point 270. There is shown a resistor 271 connected between the gate 268 and the cathode 267, a diode 272 connected at one end to the junction of resistor 271 and gate 268, and a resistor 273 connected at the other end of diode 272 and to the junctions of resistors 271 and 269 and cathode 267. A magnetic core 274 is provided with a winding 275 with a tap 276, said tap 276 being connected to the junctions of resistors 271, 273 and 269 and cathode 267, and one end of winding 275 being connected to the junction of diode 272 and resistor 273. A feed forward winding 277 on core 274 is connected through a resistor 278 to point 258 and is connected at its other end to the other end of winding 254. Additionally, there is an input winding 279 on core 274 being connected at one end to the other end of winding 264.

There is shown a third controlled rectifier 280, which could be of the silicon type, having an anode 281, a cathode 282 and a control element or gate 283, cathode 282 being connected through a resistor 284 to point 270, a resistor 285 connected between gate 283 and cathode 282, a diode 286 connected to the junction of resistor 285 and gate 283, and a resistor 287 connected at one end to diode 286 and at its other end to the junction of resistor 285 and 284 and cathode 282. A third magnetic core 288 is shown having a winding 289 with a tap 290, said tap being connected to the junctions of resistors 284, 285 and 287 and cathode 282. A feed forward winding 291 is connected at one end through a resistor 292 to point 258 and at its other end to the other side of winding 275. An input winding 293 on core 288 is connected at one end to the other end of winding 279.

A fourth controlled rectifier 294 is disclosed having an anode 295, a cathode 296 and a gate 297. Cathode 296 is connected thorugh a load resistor 298 to point 270. A resistor 299 is connected between cathode 296 and gate 297. A diode 300 is connected to the junction of resistor 299 and gate 297, and a resistor 301 is connected to diode 300 and its other end to the junctions of resistors 298 and 299 and cathode 296. A fourth magnetic core 302 is disclosed having a winding 303 with a tap 304, said tap 304 being connected to the junctions of resistors 301, 299 and 298 and cathode 296, and said winding 303 being connected at one end to the junction of resistor 301 and diode 300 and at its other end to the other end of winding 256 on core 253. There is also shown a feed forward winding 305 on core 302 being connected through a resistor 306 to point 258 and at its other end to the other end of winding 289. An input winding 307 on core 302 is connected at one end to the other end of winding 293 and at its other end to the active elements 260 of reed switch 261.

There is also disclosed an isolating diode 308 in the first counter 12 connected at one end to the cathode 247 of controlled rectifier 245 and at its other end to the junctions of diodes 233 and 235 and winding 239; henceforth that junction will be known as point 309. An isolating diode 310 is connected at one end to cathode 282 of controlled rectifier 280 and at its other end to point 309. Another isolating diode 311 is connected to the cathode 267 of controlled rectifier 266 at one end and at its other end is connected to the junction of core 240, diode 236 and diode 234, said junction will be henceforth known as junction point 312. Another isolating diode 313 is connected to cathode 296 at one end and at its other end to junction 312. Additionally, there is shown diodes 314 and 315 which form the diode matrix 14. Diode 314 is connected to the cathode 247 of controlled rectifier 245 and diode 315 is connected at one end to cathode 267 of controlled rectifier 265, both of said diodes 314 and 315 being connected to an output terminal 316 through lines 12*b* and 12*c* to provide pulse pattern A in response to the conduction of controlled rectifiers 245 and 265.

A second counter 13 is shown having a first controlled rectifier 316 having an anode 317, a cathode 318 and a control element or gate 319. Cathode 318 is connected through a load resistor 320 to point 270 on line 11*a*, a resistor 321 is connected between cathode 318 and gate 319, a diode 322 is connected at one end to the junction of gate 319 and resistor 321, and a resistor 323 is connected at the other end of diode 322 and at its other end to the junctions of resistors 320 and 321 and cathode 318. A magnetic core 324 has a winding 325 with a tap 326, the upper portion of which provides an output which turns on controlled rectifier 316. Tab 326 is connected to the junctions of resistors 320, 321 and 323 and cathode 318, and said winding 325 is connected at one end to the junction of diode 322 and resistor 323. A feed forward winding 327 on core 324 is connected through a resistor 328 to point 258. There is also disclosed a reed switch 329 having an active element 330. Said active element is connected at one end to cathode 296 of controlled rectifier 294 and its other end through an isolation diode 331 to a delay winding 332 on a core 333. Additionally, there is shown a reset winding 334 on core 333, said winding being connected at one end to ground point 201 and at its other end through a resistor 335 to point 258. An input winding 336 on core 324 is connected at one end to an end of winding 332.

There is disclosed a second controlled rectifier 337 having an anode 338, a cathode 339 and a gate 340. Anode 338 is connected to ground point 201. Cathode 339 is connected through a load resistor 341 to point 270. A resistor 342 is connected between gate 340 and cathode 339. Diode 343 is connected to the junction of resistor 342 and gate 340, and a resistor 344 is connected to the diode 343 and to the junctions of resistors 341 and 342 and the cathode 339. There is shown a magnetic core 345 having a winding 346 having a tap 347, an output from the upper portion of winding 346 being used to turn on controlled rectifier 337. Said tap 347 is connected to the junctions of resistors 344, 342 and 341 and cathode 339, and the upper end of winding 346 is connected at one end to the junction of diode 343 and resistor 344. A feed forward winding 348 on core 345 is connected at one end to the other end of winding 325 on core 324 and its other end through a resistor 349 to point 258. There is also shown an input winding 350 having one end connected to the other end of winding 336 on core 324.

There is disclosed a third controlled rectifier 351 having an anode 352, a cathode 353 and a gate 354. Anode 352 is connected to ground point 201, and cathode 353 is connected through a load resistor 355 to point 270. A resistor 356 is connected between cathode 353 and gate 354. Diode 357 is connected to the junction of gate 354 and resistor 356, and a resistor 358 is connected at the other end of diode 357 and at its other end to the junctions of resistors 355 and 356 and cathode 353. There is shown a magnetic core 359 having a winding 360 with a tap 361, the upper portion of said winding providing an output to turn on controlled rectifier 351. Said tap 361 is connected to the junctions of resistors 355, 356 and 358 and cathode 353, and said winding 360 is connected at one end to the junction of diode 357 and resistor 358 and at its other end to the other end of feed forward winding 327 of core 324. A feed forward winding 362 of core 359 is connected at one end to the other end of winding 346 of core 345 and its other end through a load resistor 363 to point 258. Input winding 364 is connected at one end to the other end of winding 350 of core 345 and at its other end through a resistor 365 to point 258, and through a capacitor 366 to ground point 201. There is also shown a reed switch coil 367 of reed switch 261 in dual pulse circuit 11 connected at one end to ground point 201 and at its other end to the junction of resistor 203 and diode 225. A second reed coil winding 368 of reed switch 329 is connected at one end to ground point 201 and at its other end to the junction of diode 225 and resistor 203 and coil 367 of reed switch 261.

Figure 9A:
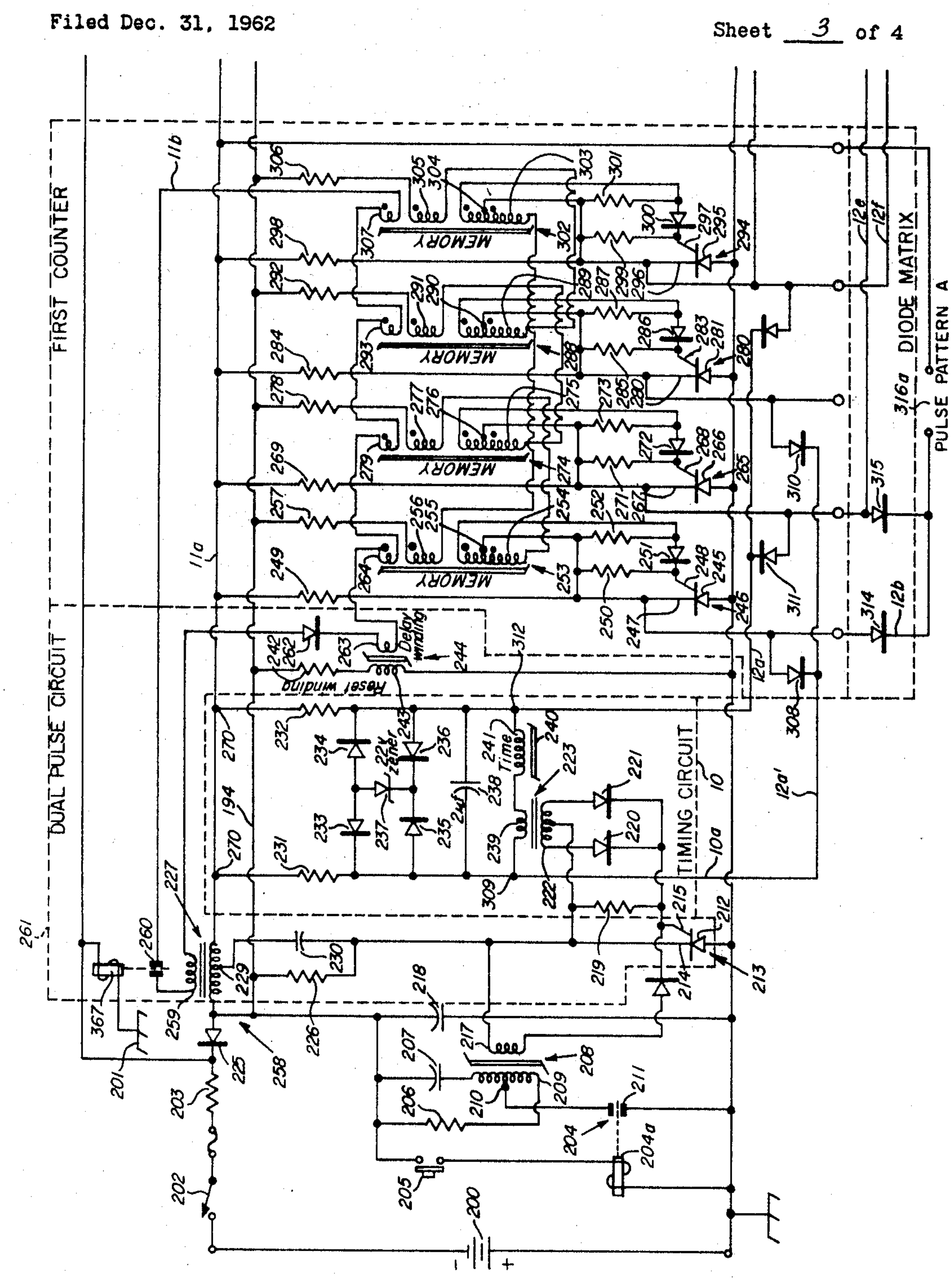
Figure 9B:
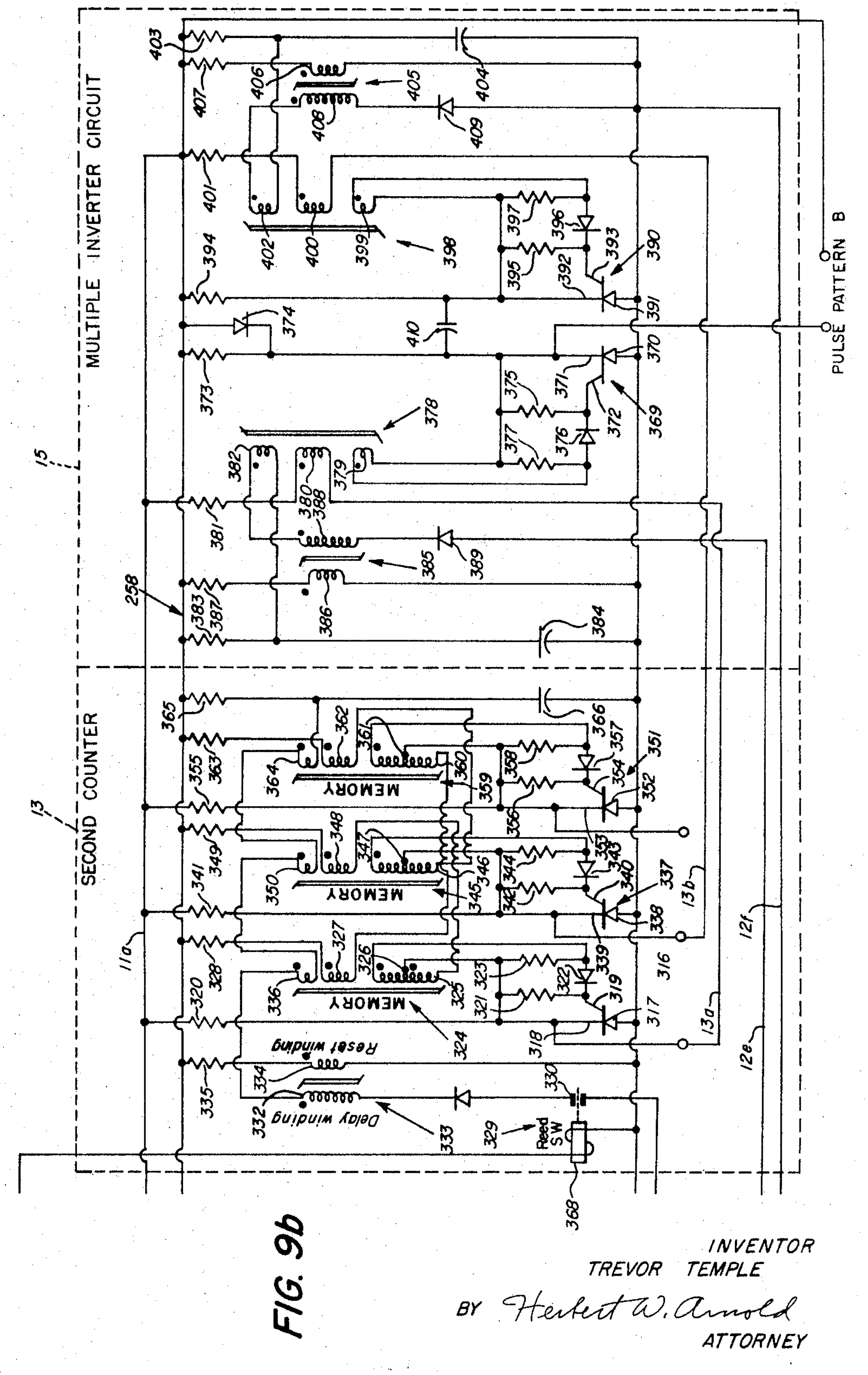

A multiple inverter circuit 15 is shown in FIG. 9*b*, said multiple inverter circuit in this case being shown with only two controlled rectifier units but it should be realized that combinations of more than two controlled rectifier units could be utilized if required if additional pulse outputs are desired. Multiple inverter 15 is shown having a controlled rectifier 369, which could be of the silicon type, with an anode 370, a cathode 371 and a control element or gate 372. Anode 370 is connected to ground point 201, and cathode 371 is connected through a load resistor 373 to point 258 and through a diode 374 to point 258. A resistor 375 is connected between the cathode 371 and the gate 372, diode 376 is connected to the junction of resistor 375 and gate 372, and a resistor 377 is connected at one end to diode 376 and at its other end to the junctions of resistors 375, 373 and diode 374 and cathode 371.

A magnetic core 378 is shown having an output winding 379 connected across resistor 377 and is used to turn on controlled rectifier 369. An input winding 380 is connected at one end through a resistor 381 to point 270 on line 11*a* and at its other end to cathode 318 of controlled rectifier 317. An input winding 382 of core 378 is shown connected at one end through a resistor 383 to point 258 and through a capacitor 384 to ground point 201. Magnetic core 385 is shown having a reset winding 386 connected at one end to ground point 201 and at its other end through a resistor 387 to point 258. Delay winding 388 is connected at one end through a diode 389 to cathode 267 of controlled rectifier 266 of FIG. 9*a* and at its other end to the other end of winding 382 of core 378.

A second controlled rectifier 390 is disclosed in multiple inverter circuit 15 having an anode 391, a cathode 392 and a control element or gate 393. Anode 391 is connected to ground point 201, and cathode 392 is connected through a load resistor 394 to point 258. A resistor 395 is connected across gate 393 and cathode 392. Diode 396 is connected to the junction of resistor 395 and gate 393, and a resistor 397 is connected at one end to diode 396 and at the other end to junctions of resistors 394 and 395 and cathode 392.

A magnetic core 398 is disclosed having an output winding 399 connected across resistor 397, and an input winding 400 connected at one end through a resistor 401 to point 270 and at its other end to cathode 339 of controlled rectifier 337. A second input winding 402 is connected at one end through a resistor 403 to point 258 and through a capacitor 404 to ground point 201. A magnetic core 405, having a reset winding 406, is connected at one end to ground point 201 and through a resistor 407 to point 258, and a second winding 408 of core 405 is connected at one end through a diode 409 to cathode 296 of controlled rectifier 294 and at its other end to the other end of a winding 402. There is also disclosed a coupling capacitor 410 which transfers off pulses between rectiers 369 and 390 by connecting cathodes 371 and 392 of said rectifiers.

Referring particularly to FIGS. *9a* and *9b* and for purposes of explanation, initially assume that controlled rectifier 245 in first counter 12 and rectifier 390 of multiple inverter circuit 15 are on or conducting, cores 274 and 324 of the first and second counters, respectively, are saturated in a reset condition which will be represented by a one state, and counter cores 253, 288, 302, 345, 359 and multiple inverter circuit cores 378 and 398 are saturated in a clear condition which will be represented by zero state. The initial saturation of the cores 274 and 324 in the reset condition and the other above-mentioned cores in the clear condition is accomplished by initially connecting an external source, such as described in connection with FIG. 8, to one of said plurality of windings on each of the cores of the first and second counters, respectively and disconnecting all other windings from the cores of the first and second counters, respectively. Additionally, after the power from battery 200 is switched into the system by closing switch 201, controlled rectifiers 245 and 390 are placed in the conducting or "on" condition by the external source applying an "on" pulse to gates 248 and 393, respectively, having first disconnected the windings of the cores connected to each of the rectifiers respectively.

Considering now the operation of the system of FIGS. *9a* and *9b*, switch 202 is closed to apply power from the single direct current source 200 to the entire system. Then by manually closing switch element 205, switch element 211 of switch element 204 is closed by a current flowing through winding 204*a*. The closing of switch element 211 allows capacitor 207 to charge through part of winding 209 developing a short positive pulse in winding 217 that is applied through blocking diode 216 to gate 215 to turn on controlled rectifier 212. The turning on of controlled rectifier 212 charges capacitor 230 through one-half of the primary winding 228 of reactor 227 in dual pulse circuit 11. The charging current by transformer action brings the load end line 11*a* connected to the primary winding 228 to a more positive condition than that of ground point 201. This action causes a first signal from the dual pulse circuit to be applied through 11*a* to each of the controlled rectifiers 245, 265, 280, 294, 316, 337 and 351 to turn off any of the controlled rectifiers of counters 12 and 13, which were in the on condition. In this particular case, controlled rectifier 245, which was in the on condition, is now turned off. Resonant charging of the capacitor 230 through winding 229 of reactor 227 then brings the capacitor voltage to a value greater than the line voltage and thus the capacitor will then discharge back into the line. This current reversal shuts off controlled rectifier 212. When the capacitor 230 charged to a voltage equal to the input D.C. voltage 200, the voltage across the reactor 228 reaches zero and then reverses as the capacitor continues to charge due to resonant charging. This reversal of the reactor voltage provides an input of read pulse by way of line 11*b* to series-connected windings 264, 279, 293, and 307 of cores 253, 274, 288, and 302, respectively. This pulse, which is the second output of the dual pulse circuit 11, is applied via line 11*b* to cause core 274 to saturate from its reset condition to the clear condition, but does not produce an output at any of the cores which were in the clear condition. This reverse saturation of core 274 produces an output pulse by way of winding 275 to gate 268 of controlled rectifier 265 to turn on controlled rectifier 265. The turning on of controlled rectifier 265 produces a positive going output pulse at cathode 267 which is applied to feed forward winding 291 to place the next succeeding core 288 in the reset condition. Additionally, this output pulse, by flowing through winding 254, additionally insures that core 274 was completely saturated by the read pulse on winding 264 from line 11*b* to provide a destructive readout of core 253. It is to be noted that this arrangement is only an additional insurance that the initial pulse over line 11*b* completely switched core 275 to the clear condition. The "on" condition of controlled rectifier 265 of first counter 12 is sensed by line 12*a* connected through isolation diode 311 to cathode 267. Conduction of controlled rectifier 265 provides a reversing source of voltage to the timing circuit 10 so that timing circuit 10 can now take control of the timing operation of the system.

The dual pulse circuit initially commenced the stepping process of the counting pulses from one memory core to the succeeding memory core. The basic timing cycle of the timing circuit 10 is determined by the time it takes the core 240 to saturate in one direction or the other in response to an alternately applied voltage at points 309 and 312. This voltage is provided by the Zener diode 237 and the associated diode network comprising diodes 233, 234, 235, and 236 in response to alternate sensing voltages on lines 12*a* and 12*a'*. When a positive signal is applied by line 12*a'* at point 309 to the combination of Zener diode 237 and diodes 233, 234, 235, and 236, diodes 234 and 235 are biased in the conducting condition and Zener diode 237, which is biased in the reverse direction, will be in the Zener breakdown region. Therefore, a voltage, approximately equal to the breakdown voltage of the Zener diode, will be applied across winding 241. When a positive signal is applied by line 12 at point 312 to the above-mentioned combination, diodes 236 and 233 will conduct and Zener diode 237 will, once again, break down so as to apply a reference voltage across winding 241. When the core 240 reaches saturation, its impedance drops to the resistance of its coil 241 and the capacitor 238 is discharged into the primary 239 of transformer 223. The secondary winding 222 provides an output pulse which is rectified by a full wave rectifier comprising diodes 220 and 221 and provides a pulse across resistor 219 to gate 215 which now places controlled rectifier 212 of dual pulse circuit 11 in the "on" condition to provide a second set of dual output pulses. This on condition causes first, a pulse to be applied by way of line 11*a* to terminate the conduction of controlled rectifier 265 and, subsequently, to provide a second pulse via line 11*b* to each of the cores of the first counter to saturate to the clear condition, the succeeding core 288 which initially was in the reset condition. This saturation of core 288 to the clear condition turns on controlled rectifier 280, which, in turn, saturates core 302 to the reset condition. The turning on of controlled rectifier 280 is sensed via line 12*a'* which recycles the timing circuit to reinitiate the dual pulse circuit. The next pulse by way of line 11*b* clears core 302 which, in turn, turns on controlled rectifier 294. With the clearing of core 302, the first counting cycle of the four memory cores 253, 274, 288 and 302 is completed. Conduction of controlled rectifier 294 provides an actuating pulse which is fed to the timer 10, memory core 253 of counter 12, memory core 324 of counter 13 and memory core 378 of multiple inverter circuit 15 in a manner to be described.

The pulse output at the cathode of controlled rectifier 294 is sensed and conduction of said rectifier feeds a pulse back through winding 256 to reset core 253 and recycle counter 12. This pulse output also is fed back to the timing circuit via line 12*a* to recycle the timing circuit to provide another pattern of high amplitude output pulses. The same pulse output is sensed at cathode 296 and provided via line 12*d* through delay winding 332 to second counter 13 including core windings 336, 350, and 364. This actuation pulse causes core 325, which initially was in the reset condition, to reverse its saturation to the clear condition, but does not affect the other cores which were initially in the clear condition. The saturation of core 325 to the clear condition turns on controlled rectifier 316 which then resets succeeding core 345 by a pulse applied to its winding 348. Further action of the second counter awaits another pulse from the first counter. The conduction of controlled rectifier 316 is then sensed and fed via line 13*a* to winding 380 of multiple inverter circuit 15 to saturate to the zero condition core 378, which was initially in the clear condition. This later pulse conditions multiple inverter circuit 15. The first counter 12 now continues to count. When the controlled rectifier 265 is turned on, a pulse output is now sensed via line 12*e* and transferred to winding 382 on core 378 through winding 388 of peaking core 385. This pulse now saturates core 378 from the reset condition to the clear condition. A signal is then produced at winding 379 and applied to gate 372 to turn "on" controlled rectifier 369. The turning on of controlled rectifier 369 produces an output pulse at cathode 371 and terminal 371*a*. This pulse flows through coupling capacitor 410 and turns off controlled rectifier 390. The conduction of controlled rectifier 369, sensed at the cathode 371, is referred to as pulse pattern B at terminal 371*a*. During this time, the first counter is continuing to count. The next time controlled rectifier 294 of counter 12 is turned "on," corresponding to one cycle of counter 12, a pulse via line 12*d*, through delay winding 332, is transferred to winding 350 to saturate core 345 of second counter 13 to the clear condition. This produces an output pulse at winding 346 to turn on controlled rectifier 337. The turning on of controlled rectifier 337 saturates succeeding core 359 to the reset condition and simultaneously transfers a pulse via line 13*b* to winding 400 of inverter circuit 15 to saturate core 398 to the reset condition. Additionally, a pulse is transferred via line 12*f* from controlled rectifier 294 of counter 11 through delay winding 408 of inverter circuit 15 to input winding 402 which now saturates core 398 to the clear condition. This saturation of core 398 to the clear condition produces an output signal at winding 399 which is applied to gate 393 to turn "on" controlled rectifier 390. The turning "on" of controlled rectifier 390 produces a pulse which is applied to cathode 371 through coupling capacitor 410 to turn off controlled rectifier 369 and terminate pulse pattern output B. Pulse pattern B, in this instance, is a continuous direct current pulse which is terminated by the conduction of controlled rectifier 390 which occurs in response to an output tapped from the fourth stage, that is, controlled rectifier 294 of the first counter. The direct current output pulse was initiated, as noted, by conduction of rectifier 265 of first counter 12. The duration of such output pulse, therefore, can be extended or shortened according to the number of stages, which are included between the initiation and terminating pulses. Thus, a flexible arrangement for obtaining output pulses of varying lengths is provided by tapping off different numbers of controlled rectifier stages. Furthermore, during the continuous operation of the first counter 12, diodes 314 and 315 sense the conduction of controlled rectifiers 245 and 265, respectively, to produce a pulse pattern A. Signals from the first and third stages of counter 12 are fed back to actuate timing circuit 10 in one direction and signals from the second and fourth stages actuate timing circuit 10 in the opposite direction to provide four timed actuation pulses.

This completes the description of the operation of an embodiment of the invention. However, many variations thereof will be apparent to persons skilled in the art. For example, variations in pulse patterns A and B can be obtained, as noted, by utilizing outputs of the controlled rectifiers in different coupling arrangements. Furthermore, it is possible to combine both the timing circuit and the dual pulse circuit into a single means for providing timed pulses. This system and its associated circuits is particularly adaptable for use in connection with telephone interrupters or static programmable pulse generators, and it is possible to use the invention shown, particularly the combination of the controlled rectifier and the magnetic core, as a logical element in connection with other devices. Accordingly, it is desired that this invention not be limited except as defined by the appended claims.

What is claimed is:

1. In a telephone system, a signal generator for producing a plurality of output signals, said generator comprising a first means for providing a plurality of timed signals, and a second means responsive to said plurality of timed signals for providing a second plurality of signals therefor, and means coupled to said second means and being responsive to said second plurality of signals for providing the plurality of output signals.

2. In a telephone system, a pulse generator for producing a plurality of output pulse patterns comprising a first means for providing a plurality of pulses, a second means coupled to said first means and responsive to said timed pulses for providing a second plurality of pulses, means for counting said second plurality of pulses coupled to said second means, and means coupled to said counting means for producing the plurality of output pulse patterns.

3. A solid state telephone interrupter for providing a plurality of output pulse patterns for telephone system applications comprising a timing circuit for producing a plurality of timed pulses, a dual pulse circuit connected to said timing circuit, said dual pulse circuit being responsive to said timed pulses to provide a second plurality of pulses, a first counter connected to said dual pulse circuit and said timing circuit, a second counter connected to said first counter and said dual pulse circuit, said first and second counters being provided to count said second plurality of pulses from said dual pulse circuit, and means connected to said first and second counters responsive to said plurality of pulses for providing a plurality of output pulse patterns.

4. A solid state telephone interrupter for providing a plurality of output pulse patterns for telephone system applications comprising timing means for providing a plurality of timed pulses, a first means coupled to said timing means for acting on said plurality of timed pulses and providing a second plurality of pulses, a second means coupled to said first means for acting on said plurality of pulses from said first means, and means for providing the plurality of output pulse patterns coupled to both said first and second means.

5. In a telephone system, a solid state signal generator for producing a plurality of output pulse patterns comprising means for providing a timing signal, and counting means coupled to said means for providing a timing signal, said counting means being responsive to said timing signal so as to provide a plurality of output pulses, and means coupled to said counting means and responsive to the pulses from said counting means for providing the plurality of output pulse patterns.

6. A solid state telephone interrupter for providing a plurality of output pulse patterns for telephone system applications comprising a timing circuit for producing a plurality of timed pulses, a dual pulse circuit coupled to said timing circuit, said dual pulse circuit being responsive to said timed pulses to provide a second plurality of pulses, counting means coupled to said dual pulse circuit, said counting means being responsive to said second plurality of pulses to provide a plurality of output pulses, and means coupled to said counting means and responsive to the pulses from said counting means for providing a plurality of output pulse patterns.

7. In a telephone system, a solid state telephone interrupter for providing a plurality of output pulse patterns comprising means for providing a first plurality of timed pulses, a first means coupled to said means for providing a first plurality of timed pulses for counting said first plurality of timed pulses providing a second plurality of timed pulses, and a second means coupled to said first means for counting said first plurality of timed pulses and said second plurality of timed pulses and simultaneously providing a third plurality of timed pulses, and means coupled to said first and second means and responsive to said pluralities of timed pulses from said first and second means for providing the plurality of output pulse patterns.

8. A pulse generator for producing a plurality of output pulse patterns comprising means for providing a plurality of timed pulses, means coupled to said means for providing a plurality of timed pulses for converting said timed pulses into a second plurality of timed pulses, counter means coupled to said means for providing said second plurality of timed pulses for counting said second plurality of timed pulses, said counter means being responsive to said second plurality of timed pulses to provide a plurality of output pulses, and means coupled to said counter means and responsive to the output pulses from said counter means for providing the plurality of output pulse patterns.

9. In a telephone system, a solid state telephone interrupter for providing a plurality of output pulse patterns comprising means for providing a plurality of timed pulses, means for converting said plurality of timed pulses into a second plurality of timed pulses, a first means for counting said second plurality of timed pulses and providnig a third plurality of timed pulses, a second means for counting, in combination, said second plurality of timed pulses and said third plurality of timed pulses and providing a fourth plurality of timed pulses, and means coupled to said first and second means for providing the plurality of output pulse patterns from said third and fourth plurality of timed pulses.

10. A solid state pulse generator for producing a plurality of output pulse patterns comprising means for providing a plurality of timed pulses, a first means for counting said plurality of timed pulses and providing a second plurality of pulses, a second means for counting said pluralities of pulses from said first means and said means for providing said timed pulses, said first and second means responsive to said pluralities of pulses for providing a plurality of output pulses, means responsive to the plurality of output pulses from said first means for providing one output pulse pattern connected to said first means, and means for providing a second pulse pattern connected to both said first and second means.

11. A solid state pulse generator for producing a plurality of output pulse patterns comprising means for providing a plurality of timed pulses, said means comprising a magnetic core device, means for converting said plurality of timed pulses into a second plurality of timed pulses, said means for converting comprising a solid state controlled rectifier device, a first means for counting said second plurality of timed pulses and providing a third plurality of timed pulses, said first means for counting comprising a plurality of magnetic core-solid state controlled rectifier devices, a second means for counting said third plurality of timed pulses and providing a fourth plurality of timed pulses, said second means for counting comprising a plurality of magnetic core-solid state controlled rectifier devices and means coupled to said first and second means and responsive to said third and fourth pluralities of timed pulses, respectively, for providing the plurality of output pulse patterns.

12. A solid state pulse generator for producing a plurality of output pulse patterns comprising a timing circuit, for producing a plurality of timed pulses said timing circuit comprising a magnetic core device, a dual pulse circuit connected to said timing circuit being responsive to said timed pulses to provide a second plurality of pulses, said dual pulse circuit comprising a solid state controlled rectifier, a first counter connected to said dual pulse circuit, said first counter comprising a plurality of magnetic core-solid state controlled rectifier counter elements, a second counter connected to both said dual pulse circuit and said first counter, said second counter comprising a plurality of magnetic core-solid state controlled rectifier counter elements, said first counter counting said second plurality of timed pulses and providing a third plurality of timed pulses, said second counter counting said third plurality of timed pulses and providing a fourth plurality of timed pulses, a diode matrix connected to said first counter being responsive to said third plurality of timed pulses for providing one output pulse pattern, a multiple inverter circuit connected to said first and second counters being responsive to said third and fourth pluralities of timed pulses for providing another output pulse pattern, said multiple inverter circuit comprising a plurality of magnetic core-solid state controlled rectifier counter elements.

13. A pulse generator for use in machine programming and other applications requiring finite timing in conjunction with substantial power levels for producing a plurality of output pulse patterns comprising a timing generator, for producing a plurality of timed pulses a dual pulse generator connected to said timing generator, and being responsive to said plurality of timed pulses to provide a second plurality of timed pulses a first ring counter connected to said dual pulse generator, said ring counter comprising a plurality of magnetic core-solid state controlled rectifier counter elements, a second ring counter conected to said first counter and said dual pulse generator, said second counter comprising a plurality of magnetic core-solid state controlled rectifier counter elements, said first ring counter counting said second plurality of timed pulses and providing a third plurality of timed pulses, said second ring counter counting said third plurality of timed pulses and providing a fourth plurality of timed pulses, a matrix connected to said first counter, said matrix being responsive to said third plurality of timed pulses to provide one output pulse pattern, and a multiple inverter circuit connected to said first and second counters, said multiple inverter circuit being responsive to said third and fourth pluralities of timed pulses to provide another output pulse pattern, said multiple inverter circuit comprising a plurality of magnetic core-solid state controlled rectifier counter elements.

14. A pulse generator for use in machine programming and other applications requiring finite timing in conjunction with substantial power levels for producing a plurality of output pulse patterns comprising, means for providing a plurality of timed pulses, a first means for counting said plurality of timed pulses and providing a second plurality of pulses, a second means for counting said plurality of pulses from said first means, means for providing a first pulse pattern connected to said first means, and means for providing a second pulse pattern connected to both said first and second means.

15. In a pulse generator, for producing a plurality of output pulse patterns a timing circuit, said timing circuit for producing a plurality of timed pulses comprising means for obtaining a constant voltage having a pair of end points, a series connection of means for providing an output signal and magnetic core means connected across said means for obtaining a constant voltage, a series combination of resistance means having a tap between said resistance means, said series combination connected across said means for obtaining a constant voltage, means for supplying a voltage having a plurality of terminals connected at one of said terminals to said tap between said resistance means, and means for selectively connecting another of said terminals of said means for supplying a voltage to each of said pair of end points of said means for obtaining constant voltage, a dual pulse circuit connected to said timing circuit, said dual pulse circuit being responsive to said timed pulses from said timing circuit to provide a second plurality of timed pulses, said dual pulse circuit comprising a solid state controlled electrical discharge device having an anode, cathode and a gate, means for supplying an input signal between said cathode and said gate of said discharge device, means for supplying a voltage between said anode and said cathode of said discharge device, reactor devices having a primary and secondary winding, said primary winding having a tap between its end points, said primary connected at one end to said means for supplying a voltage, a capacitor connected between said cathode and said tap, means for supplying a first output signal connected between said primary winding at its other end and said anode, and means for supplying a second output signal comprising magnetic core means connected to said secondary winding, a first counter connected to said dual pulse circuit for counting said second plurality of timed pulses and providing a third plurality of timed pulses, said first counter comprising a plurality of magnetic cores, each of said cores having a plurality of windings, a plurality of solid state controlled electrical discharge devices each connected to one of said plurality of windings of each of said plurality of magnetic cores, means for providing a shut off signal to each of said plurality of discharge devices, means for providing a read signal to one of said plurality of windings on each of said plurality of magnetic cores, and means for connecting said plurality of magnetic cores, a second counter connected to said dual pulse circuit and to said first counter for counting said third plurality of timed pulses and for providing a fourth plurality of timed pulses, said second counter comprising a plurality of magnetic cores, each of said cores having a plurality of windings, a plurality of solid state controlled electrical discharge devices each connected to one of said plurality of windings of each of said plurality of magnetic cores, means for providing a shut off signal to each of said plurality of discharge devices, means for providing a read signal to one of said plurality of windings on each of said plurality of magnetic cores, and means for connecting said plurality of magnetic cores, a diode matrix connected to said first counter and being responsive to said second and third pluralities of timed pulses from said first counter to provide one output pulse pattern, and a multiple inverter circuit connected to said first and second counters, and being responsive to said third and fourth pluralities of timed pulses to provide another output pulse pattern, said multiple inverter circuit comprising a plurality of magnetic cores, each of said plurality of magnetic cores having a plurality of windings, a plurality of solid state controlled rectifiers connected to one of said plurality of windings of each of said plurality of magnetic cores, means for interconnecting each of said plurality of solid state controlled rectifiers, means for providing a first write signal to one of said plurality of windings on one of said plurality of magnetic cores, means for applying a second write signal to one of said plurality of windings on another one of said plurality of magnetic cores, means for applying a first read signal to one of said plurality of windings of one of said plurality of magnetic cores and means for providing a second read signal to one of said plurality of windings of another one of said plurality of magnetic cores.

16. In a telephone system having a pulse generating system for producing a plurality of output pulse patterns, a signal generator comprising a timing means for providing a plurality of timed pulses having a particular timing cycle, a dual pulse circuit responsive to the timed pulses for producing a second plurality of timed pulses, first and second counting means responsive to the second plurality of pulses from said pulse circuit, said first and second counting means simultaneously receiving a pulse from said pulse circuit, said first counting means also receiving a delayed second pulse from said pulse circuit, said first counting means conducting on arrival of said delayed second pulse to generate a pulse which is sensed and fed back to said timing means to reinitiate the timing cycle, a diode matrix for sensing conduction of said first counting means and for combining said sensed pulses into one output pulse pattern, said timing means repeating the timing cycle until said first counting means recycles itself and simultaneously transmits a pulse to said second counting means, said second counting means upon receiving said pulse from said first counting means initiating an output pulse, and inverting means responsive to said output pulses from said second counting means, said first counting means providing pulses to said inverting means which in combination with the output pulses from said second counting means, causes said inverting means to initiate another output pulse pattern, the cycle being repeated until said inverting means ceases to provide said another output pulse pattern.

References Cited

UNITED STATES PATENTS 3,388,346 6/1968 Roof et al. ---------- 331—111

BERNARD KONICK, *Primary Examiner.*

S. POKOTILOW, *Assistant Examiner.*

U.S. Cl. X.R.

307—106